US006968465B2

(12) United States Patent
Freevol et al.

(10) Patent No.: US 6,968,465 B2
(45) Date of Patent: Nov. 22, 2005

(54) MULTIPLE SERVER IN-RUSH CURRENT REDUCTION

(75) Inventors: Jason W. Freevol, Cypress, TX (US); Alexander C. Ekrot, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 561 days.

(21) Appl. No.: 10/178,300

(22) Filed: Jun. 24, 2002

(65) Prior Publication Data

US 2003/0237008 A1 Dec. 25, 2003

(51) Int. Cl.$^7$ .............................. G06F 1/30; G06F 1/26
(52) U.S. Cl. ...................... 713/300; 713/330; 323/908
(58) Field of Search .................. 725/150; 713/310, 713/300, 330; 714/36; 375/354; 382/245; 323/908

(56) References Cited

U.S. PATENT DOCUMENTS

| | | | | |
|---|---|---|---|---|
| 4,805,195 A | * | 2/1989 | Keegan | 375/354 |
| 5,335,087 A | * | 8/1994 | Cho | 382/245 |
| 5,881,361 A | * | 3/1999 | Mannette et al. | 725/150 |
| 5,962,930 A | * | 10/1999 | Cluff et al. | 307/66 |
| 6,536,671 B1 | * | 3/2003 | Baentsch | 235/487 |
| 6,647,512 B1 | * | 11/2003 | James et al. | 714/36 |
| 6,735,704 B1 | * | 5/2004 | Butka et al. | 713/300 |
| 6,766,222 B1 | * | 7/2004 | Duley | 700/286 |
| 6,836,849 B2 | * | 12/2004 | Brock et al. | 713/310 |

OTHER PUBLICATIONS

Kevin Ross, "Very Basic Circuits", Mar. 1997, http://www.seattlerobotics.org/encoder/mar97/basics.html.*
"What is a DIP Switch?", Mar. 1, 2002. http://www.webopedia.com/TERM/D/DIP_switch.html.*
J. Scott Gardner, "PC Motherboard Technology", Jun. 12, 2001, http://www.extremetech.com/print_article2/0,2533,a=1059,00.asp.*

* cited by examiner

Primary Examiner—Thomas Lee
Assistant Examiner—Ji H. Bae

(57) ABSTRACT

The specification discloses a system and related method for delaying the powering-on of a server after loss of power. In this way, each server in a rack of servers may have its power restored at staggered times to minimize in-rush current associated with start-up of the rack-mounted server system.

34 Claims, 2 Drawing Sheets

MULTIPLE SERVER IN-RUSH CURRENT REDUCTION

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed generally to rack-mounted server systems. More particularly, the preferred embodiments are directed to reducing in-rush current when powering-on a rack or multiple racks of servers at the same time.

2. Background of the Invention

As the state of computer technology advances, the size of computers, especially servers, continues to decrease. While early server systems may have had multiple servers (or computers) in a single equipment rack, modern server footprints have decreased dramatically. In fact, it is now possible to put ten or more modem servers in the same physical space that one early server previously occupied. Further, modem servers typically contain multiple microprocessors, in spite of their smaller footprint, so the power density of each server has substantially increased. The power density "ceiling" only a few years ago was 1–3 kilowatts of power in a 42U rack; however, modem 42U server equipment racks consume up to 20 kilowatts of power.

The Electronic Institute of America (EIA) has defined a standard for mounting electronic equipment that has been widely adopted among the industry standard server marketplace. The standard unit of measure for physical server height is a "U" where 1U is 1.750 inches. EIA racks commonly come in 19 inch widths, although there are some 23 inch widths as wells. Server heights (or widths, depending upon their orientation within the rack) are typically measured in integer multiples of the unit U. For example, a 2U server has a height of approximately three and a half inches. As of this writing, servers having a 1U height and having multiple processors are typical. Server equipment racks come in multiple heights, but 22U, 36U, 42U and 48U are the most common in data centers. It is not uncommon to have as many as forty-two servers (computers) in a single 42U tall rack. Each of the servers acts as an independent computer, and thus requires connection to a power source and draws power during operation.

Distribution of power to the servers in rack-mounted server systems of the related art takes place by means of a Power Distribution Unit (PDU). A PDU may be as simple as a location within the rack-mounted server system to plug a set of standard 120 or 220 volt AC connectors, together with a breaker, or may be as complex as a power and frequency conditioning system. Regardless of the complexity, PDUs of the related art are typically located inside the server equipment rack enclosure together with The rack mounted computers, or directly under the rack in the cable and air conditioning space underneath a raised floor. Due to the large number of power cords, network cables, keyboard cables, video cables, mouse cables, and the like, it is very common that the PDUs of the related art are at best inconveniently accessible for resetting of any internal breakers, and are extremely inaccessible in the event they need to be replaced. Stated otherwise, while the PDUs may represent some over-current protection for servers in the rack-mounted server system, they are not meant to be the primary element in over-current protection.

Related art servers typically have the ability to remember their previous operational state on loss of supply power, and return the server to the previous operational state upon return of supply power. For example, if a server system was already in a powered down condition at a loss of overall power, mechanisms within the server remember the previous state and do not attempt to automatically boot the server upon power being restored. If, however, the server was operating when power was lost, related art systems remember the previous operational condition, through the use of non-volatile memory, and attempt to restore the server to an operational state upon the return of power. This feature of returning to previous operational states upon return of power after a loss of power, in combination with server density (which is ever-increasing), produces in-rush current problems. Consider for purposes of explanation a rack-mounted server system having forty-two servers, all powered and operational. Further consider that power to the rack-mounted system is lost due to an unscheduled event (electric utility failure, electrician opening wrong breaker, or the like), thus causing all forty-two servers to shut down. Once power is restored, all forty-two servers, remembering their previous operational state, draw power and attempt to restart operations. In-rush currents associated with each of these servers simultaneously attempting to power-on, in the related art, can draw too much current for the power distribution system, including the PDUs. Thus, in the related art system, one or more of the PDUs may trip their breakers, or worse, the current in-rush may damage a PDU. In either case, the servers that receive power from the tripped or destroyed PDU are no longer operational. As was discussed above, while it is possible to reset the breakers on the PDUs, this is not an easy or efficient task as it requires a person to physically access the breaker to reset it. Moreover, replacing the PDUs may disable the rack-mounted server system for many hours or even days.

In-rush current can be described as a large current spike that is short in duration that occurs when power is first applied to a power supply. The current needed to charge bulk capacitors in the power supply and bulk capacitors on each computer system board appear to the power supply outputs like a short circuit for a very brief amount of time (typically less than 0.01 sec). During this short period of time, a large amount of current is drawn by the power supply to charge these capacitors causing a current surge at the power supply line cord input. Additionally, electric motors, for example fan motors, have start up current requirements that far exceed their steady state current draw. All of these current devices downstream of the power supply cause corresponding increase in current demand through the PDU's while the demands are being met.

PDUs and circuit breakers are typically cascaded in a power delivery system between the primary power input to the data center and each individual server, and must be compliant with various safety regulatory laws that vary from country to country. While laws may require certain safety margins to be followed when sizing circuit wiring and breakers in the equipment room, it is a very common mistake for users to over-load a PDU without actually knowing it. This is possible because most servers only draw a fraction of their fully rated power consumption when in "steady state" or idle conditions. Due to the random workloads imposed upon various servers, a user may add another computer to a PDU circuit that is already overloaded per specifications. This compounds the inrush current problem described above since most computer systems draw considerably more power during power up self test than during steady state operation (due to cache, memory and CPU diagnostic tests being run in parallel with hard disk drives being spun up).

Thus, what is needed in the art is a mechanism to allow server systems to use the beneficial feature of returning to their previous operational state upon return of power without the possibility of tripping or otherwise destroying the relatively inaccessible PDUs.

BRIEF SUMMARY OF SOME OF THE PREFERRED EMBODIMENTS

The problems noted above are solved in large part by a method and apparatus for staging or staggering the times that each server in a rack-mounted server system is allowed to power-on (if that was the server's previous operating condition) after a loss and return of power. The staging or staggering may take the form of setting each server to begin powering-on at a predetermined amount of time after return of power, and may also comprise a random or pseudo-random start time for each of the servers.

The preferred implementation comprises a programmable array logic (PAL) coupled in the circuit between the super input/output controller and the power-on input signal of the power supply. Based on the contents of a non-volatile storage in the computer system, preferably within non-volatile random access memory coupled to the lights-out processor, the PAL provides a programmable delay of the power-on signal propagating between the super input/output device and the power supply.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
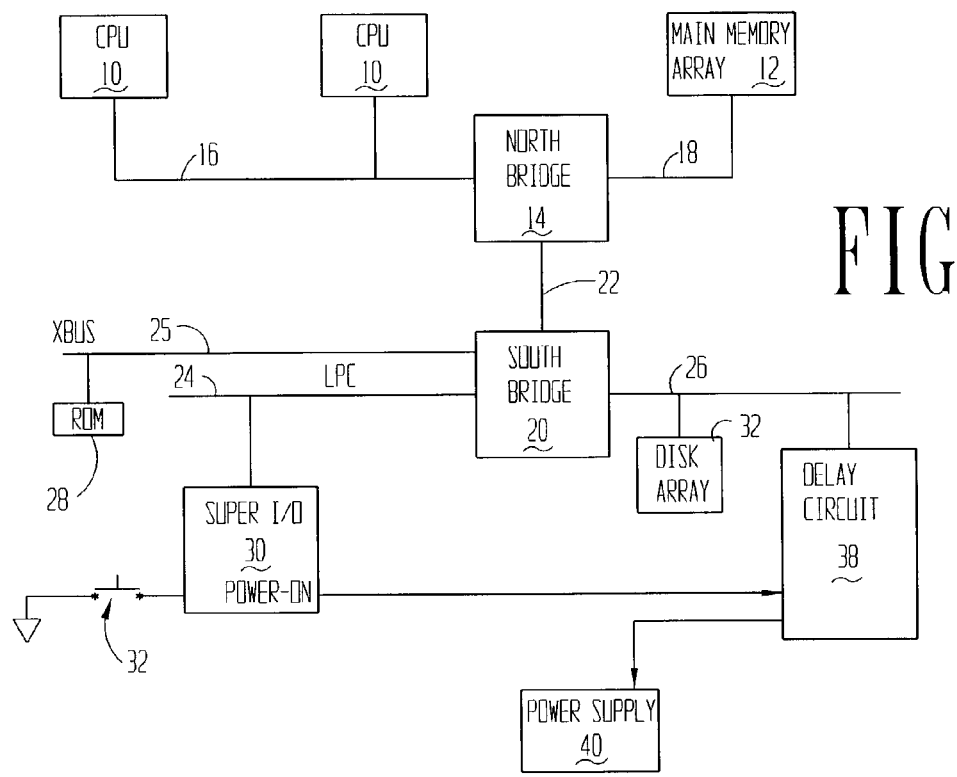
FIG. 1 shows, in block diagram form, a server of the preferred embodiment.

FIG. 1 shows a computer system or server 100 constructed in accordance with the preferred embodiment. Server 100 generally comprises one or more central processing units (CPUs) or microprocessors 10 coupled to a main memory array 12, and various other peripheral computer system components, through an integrated host bridge 14. The host bridge 14 may sometimes be referred to as a north bridge, for no other reason than that it is generally in an upper position in computer system block diagrams. The CPUs 10 preferably couple to the north bridge 14 via a host bus 16. The CPUs 10 preferably comprise Xeon™ microprocessors manufactured by Intel Corporation. It should be understood, however, that server 100 could comprise other types and brands of microprocessors as well. In the preferred embodiments, the north bridge 14 preferably comprises a part number NB6576 north bridge device produced by Serverworks, Inc. of Santa Clara, Calif.

Main memory array 12 preferably couples to the north bridge 14 by way of a memory bus 18. The north bridge 14 preferably comprises a memory control unit (not shown) that controls transactions to the main memory array 12 by asserting the necessary control signals during memory accesses. The main memory array 12 functions as the working memory for the CPUs 10 and generally comprises a conventional memory device or array of memory devices in which programs, instructions and data are stored. The main memory array 12 may comprise any suitable type of memory such as dynamic random access memory (DRAM) or any of the various types of DRAM devices such as synchronous DRAM (SDRAM), DDR SDRAM, extended data output DRAM (EDO DRAM), or RAMBUS DRAM (RDRAM).

The server 100 also comprises a south bridge logic device 20 coupled to the north bridge 14 by way of a primary expansion bus 22. The primary expansion bus 22 preferably comprises a thin intermodule bus (TIMB), which is a proprietary bus of Serverworks, Inc.; however, any suitable primary expansion bus, such as a peripheral components interconnect (PCI) bus, may be used depending upon the north bridge 14 and south bridge 20 system chosen. Thus, the south bridge 20 bridges a primary expansion bus 22 to various secondary buses such as a low pin count (LPC) bus 24, an XBUS 25 and a PCI bus 26. Much like the north bridge 14, the south bridge 20 derives its name generally from its location in a block diagram description of a server. In accordance with the preferred embodiment, the bridge device 20 comprises a part number SB7440 device produced by Serverworks, Inc. of Santa Clara, Calif. While both the north bridge 14 and the south bridge 20 are described as Serverworks devices, bridge devices manufactured by other companies are acceptable as well. Although the south bridge 20 is shown in FIG. 1 only to support the LPC bus 24 and the PCI bus 26, various other secondary buses may be supported by the south bridge 20, such as a universal serial bus (USB) and IDE bus configurations.

Referring still to FIG. 1, a read-only memory (ROM) device 28 couples to the south bridge 20 by way of the XBUS 25. The ROM device 28 preferably comprises software programs executable by one or more of the CPUs 10. The software programs preferably comprise not only programs to implement Basic Input/Output System (BIOS) commands, but also comprise instructions executed during and just after power-on self test (POST) procedures, as well as other server specific functionality. The POST software programs perform various functions including verifying proper operation of the system components before control of the system is turned over to the operating system. Further, the ROM 28 preferably comprises programs that allow the user to set and adjust parameters contained in non-volatile storage locations, discussed more fully below.

The LPC bus 24 couples a super input/output (super I/O) controller 30 to the south bridge 20. The super I/O controller 30 controls many computer system functions including interfacing with various input and output devices such as a keyboard, mouse, serial ports, and floppy drives (not shown). The super I/O controller 30 also couples to the front panel power button 32, and has the ability to power-on and power-down the server 100 when commanded by either the external power button 32 or by software, independent of the power button. The super I/O controller of the preferred embodiments is a part No. PC87414 produced by National Semiconductor. However, super I/O controllers produced by other manufacturers may be equivalently used. The super I/O controller 30 is often referred to as "super" because of the many I/O functions it may perform.

The server system 100 also comprises a disk array 32 coupled to the south bridge 20 by way of the PCI bus 26. The disk array 32 may comprise only a single disk drive, but preferably comprises an array of disk drives implementing fault-tolerant operation.

FIG. 1 also shows the preferred implementation for routing of the power-on signal of the preferred embodiments. In particular, the power button 32 preferably couples to the super I/O 30. Thus, a user wanting to power on the server need merely push the button 32, which informs the super I/O controller 30. Because the super I/O controller of the preferred embodiments operates from auxiliary power, this circuit, and others, are active when the server 100 is considered to be powered down. Pushing the power button 32 asserts the power-on output signal from the super I/O controller 30, which is coupled to the delay circuit 38. The delay circuit 38 couples the power-on signal from the super I/O controller 30 to the power supply 40. The delay circuit 38 of the preferred embodiments provides a programmable time delay for the power-on signal. By appropriately setting the programmable delay in the delay circuit 38, each server 100 in a rack-mounted server system may be programmed to start at staged staggered times such that the in-rush current stays below the breaker trip point or damaging current flows to the PDUs.

Figure 2:
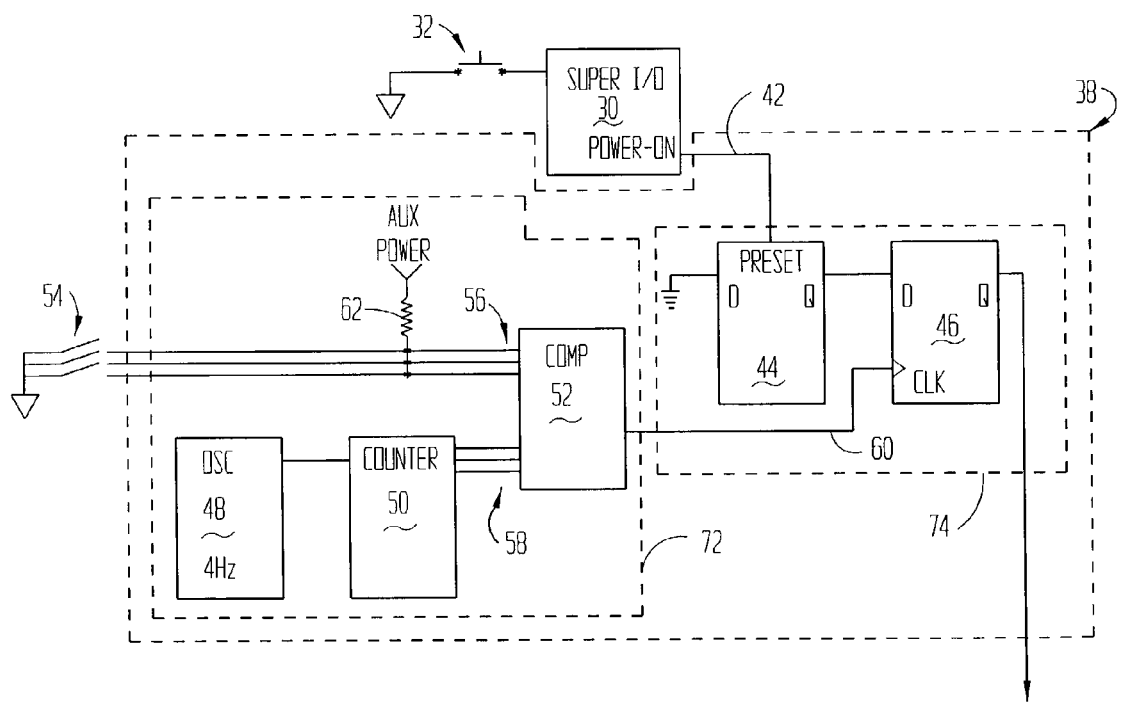
FIG. 2 shows an embodiment of the delay circuit of the preferred embodiment.

The super I/O controller 30 of the preferred embodiments, a part No. PC87414 produced by National Semiconductor, has the ability to keep track of the last operational state upon loss of power. More particularly, the super I/O controller 30 has some non-volatile memory that keeps track of the last operational state of the server system. Thus, when a power cord of a server system is plugged in, the super I/O controller, which is powered by auxiliary power, polls its non-volatile memory regarding the previous operational state. If the server 100 was powered-down when overall power was lost, the super I/O controller 30 takes no additional action in this regard. If, however, the server 100 was operational when power was lost, the controller 30 preferably asserts the power-on signal in an attempt to restore the server to its previous operational state. As was discussed in the background section, if every server in a rack of servers, for example forty-two, attempts to power-on at the same time, there exists the possibility that the PDUs may trip their over-current protection devices. In order to alleviate this possibility, in the preferred embodiments, the power-on signal 42 couples to the power supply 40 through the delay circuit 38, which provides a programmable delay. FIG. 2 shows an embodiment in which this delay may be implemented.

The delay circuit 38 of the preferred embodiments has two major components; a timer circuit 72 and a latch circuit 74. The latch circuit 74 receives the power-on output signal of the super I/O controller 30 and latches the signal until a timer output signal 60 is received from the timer circuit 72. While The latch circuit 74 may be implemented many ways, in the preferred embodiment, the latch circuit 74 is implemented using two D flip-flops, as indicated in FIG. 2. Because the input of the flip-flop 44 is grounded, assertion of the preset signal by the power-on output signal asserts the output (Q) of the flip-flop 44, providing an asserted state to the input of the flip-flop 46. A D-type flip-flop can be considered a delay element where the input propagates to the output on assertion of the clock. The clock signal of flip-flop 46 is the timer output signal 60 from the timer circuit 72.

The timer circuit 72 implements a programmable clock signal for flip-flop 46. Comparator 52 compares its first set of inputs 56 to its second set of inputs 58, and asserts the timer output signal 60 only when the two sets of inputs 56, 58 are the same. The first set of inputs 56, in this embodiment, are produced by the external dip switches and pull-up resistor 62, and are a setpoint signal. Using the three dip switches (3 bits) shown, eight possible combinations exist for the inputs 56.

While the dip switches 54 and pull-up system create the setpoint signal, the oscillator 48 and counter 50 act as a timing circuit. Oscillator 48 preferably operates at 4 Hertz and thus produces a signal that changes state four times a second. The clock signal couples to the counter 50, which preferably increases its count value by one with each assertion of the clock signal. Assuming that the count value (which is also the comparator 52 inputs 58) start at zero, the combination of the oscillator 48 and counter 50 produces a full scale count in two seconds. Thus, if a user sets the dip switches 54 such that the inputs 56 to the comparator 52 are all low, then the comparator 52 produces an asserted signal immediately, as the counter preferably starts its count at zero. Likewise, if a user opens the dip switches 54, then the inputs 58 of the comparator 52 will not match the inputs 56 for two seconds (given an oscillator 48 frequency of 4 Hertz), delaying assertion of the comparator output for two seconds.

Regardless of the delay implemented in the combination of the timer circuit 72, the flip-flop 46 has waiting at its input an asserted state (based on the preset operation at flop-flop 44). As soon as the comparator 52 asserts the timer output signal 60, the asserted signal at the D input of the flip-flop 46 propagates to the output Q and is coupled to the power-on supply signal of the power supply 40. In response, the power supply powers the server.

Figure 3:
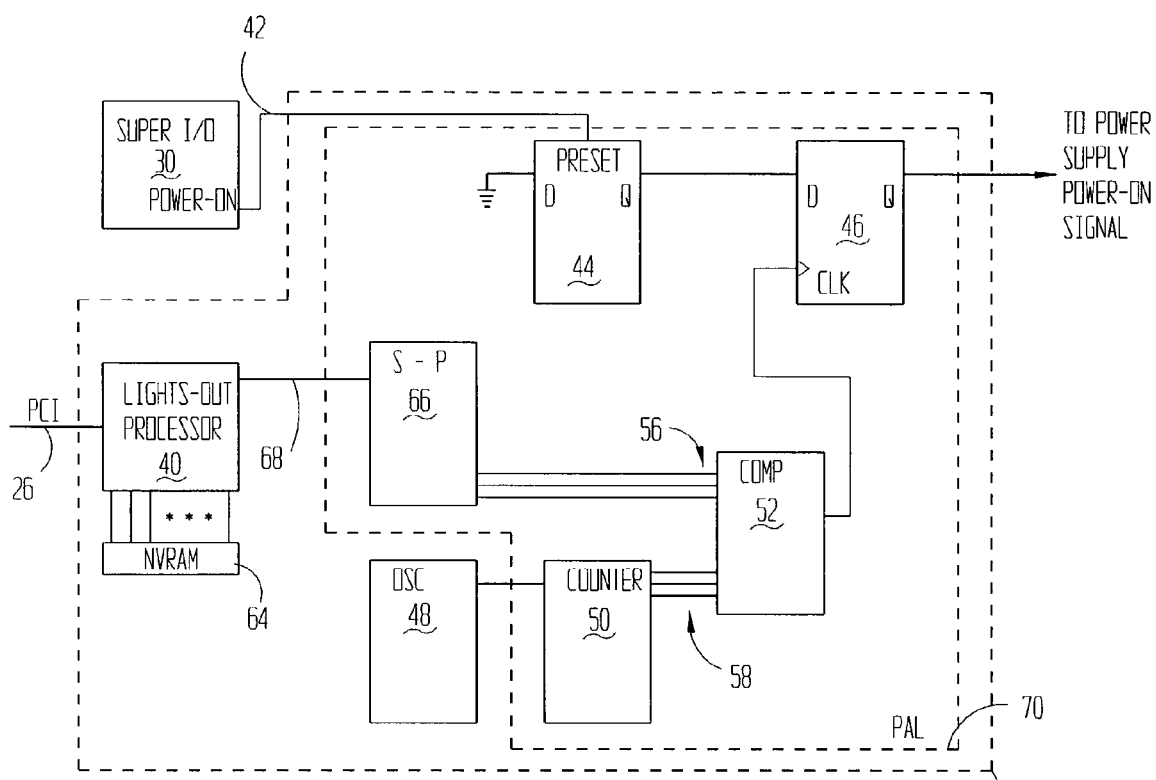
FIG. 3 shows a second embodiment of the delay circuit of the preferred embodiment.

While the embodiment shown in FIG. 2 would be operational, the preferred embodiment of the delay circuit is shown in FIG. 3. Instead of using the dip switches 54 as shown in FIG. 2, the preferred embodiment sets a delay or trigger time through the use of an integrated lights-out processor 40, a set of non-volatile RAM (NVRAM) 64, a serial parallel conversion circuit 66, and a program stored on the ROM 28 and executed by one of the CPUs 10. Much like the super I/O controller 30 in the remaining circuitry, the lights-out processor 40, preferably a microcontroller, is powered by auxiliary power and is thus operational when the overall server 100 is powered down. The lights-out processor 40 of the preferred embodiment is an application-specific integrated circuit (ASIC) that may perform many functions, but as it relates to the preferred embodiment, the lights-out processor has two primary purposes. The first purpose is to receive, across the PCI bus 26, bits of information that represent the delay or trigger time to use for the particular server 100. The lights-out processor 40 preferably stores the bits of information on the NVRAM 64. Thus, a user sets bits in the NVRAM 64 to indicate the amount of delay desired by software, rather than having to physically open the server and set dip switches as in the embodiment shown in FIG. 2.

The second function of the lights-out processor 40, as it relates to the preferred embodiments of this invention, is to transfer the bits of information representing the delay time to the serial parallel converter 66 over the serial transfer line 68. Before proceeding, it must be understood that the serial communication path between the lights-out processor 40 and the programmable array logic (PAL) 70, which implements the specific functionality of the embodiment described, is designed to communicate as many as sixty-four bits of information, the great majority of which are used for purposes not related to the present application. In the preferred embodiments, only three of those bits are dedicated to setting the delay time for the power-on signal; however, if greater control over the delay is required, the number of bits dedicated to setting the programmable delay of the power-on signal may be increased (along with corresponding increases in the clock rate of the oscillator 48). In the preferred embodiments, only three bits of the sixty-four bits of information that transfers between the lights-out processor 40 and the serial to parallel converter 66 are dedicated for use in setting the programmable delay. Thus, the serial to parallel circuit 66 makes available to the comparator 52 at its inputs 56 three bits representing the desired delay time (which may alternatively be referred to as count setpoint signals). With the exception that the delay time is set electronically rather than physically, the description of operation of the oscillator 48, counter 50, comparator 52, flip-flop 44 and flip-flop 46 are the same as that described with respect to FIG. 2.

Figure 4:
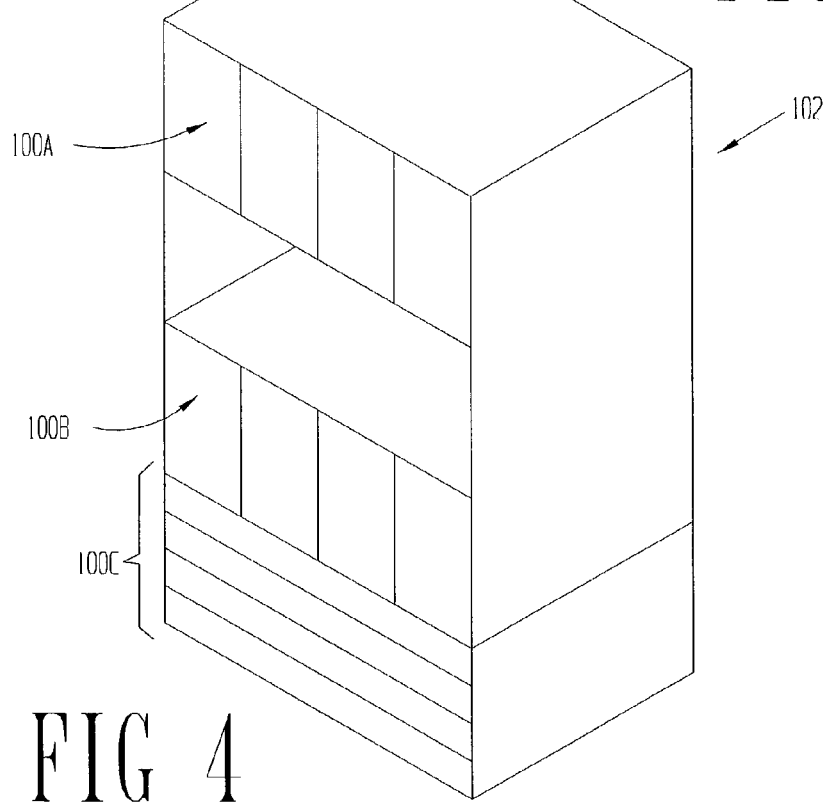
FIG. 4 shows a rack-mounted server system.

Consider now for purposes of explanation a server 100 installed in a rack-mounted server system 102 as shown in FIG. 4. In particular, FIG. 4 shows the rack-mounted server system 102 has a plurality of servers 100 mounted therein. FIG. 4 also exemplifies that the servers can be mounted vertically, such as servers 100A,B, or horizontally, such as servers 100C. If each of the servers 100 powers on at exactly the same time automatically after power is restored, there is the possibility that breakers in the PDUs may trip, or that physical damage may occur to the PDUs. As part of the set-up procedure of each server 100, the user preferably enters a ROM-based utility program, normally stored on the ROM 28 and executed by one of the CPUs 10, to set a desired delay time for the power-on signal through the delay circuit 38. Alternatively, the user could set the NVRAM through a lights-out processor 40 based web management interface. Setting the delay could take many forms. For example, the user could simply set a desired delay in any applicable units, such as seconds. Moreover, the ROM-based or web-based set-up utility could generate, at the direction of the user, a random or pseudo-random number to be placed in the NVRAM 64 representing a programmable delay for the server system. Further, the delay could be based on some other parameter, such as the last three digits of the serial number of the server. Regardless of the precise manner in which the delay is determined and set, in the preferred embodiments powering-on of each server 100 in a rack-mounted server system is set such that the in-rush current will not, or is less likely to, trip breakers in the PDUs.

Consider an operating server 100 with its programmable delay previously set. Because the server 100 is operational, the super I/O controller 30 is preferably aware of the operational state when power is lost. Upon return of power to the system, all the devices powered from auxiliary power, including the delay circuit 38 and the super I/O controller 30, become operational. The lights-out processor 40 transfers, over the serial transfer line 68, information regarding the delay time to the serial-to-parallel converter 66. Thus, the preferred three bits of information are available at the input 56 of the comparator 52. Simultaneously, the oscillator 48 begins cycling and the counter 50 counting the clock pulses. Thus, an initial application of auxiliary power after a total power loss effectively acts as a reset of the delay circuit 38 including the counter value 50. Somewhat simultaneously with these actions, the super I/O controller 30 asserts its power-on output signal 42 to the flip-flop 44, indicating the super I/O controller's desire to return the server 100 to its previous operational state—powered-on. Presetting the flip-flop 44 produces an asserted signal at the output Q which feeds the input D of flip-flop 46. However, because, in this example, the counter value has yet to equal the input 56 of the comparator 52, the timer output signal has yet to be asserted to the flip-flop 46. As soon as the input value 58 matches the input value 56, the comparator's output becomes asserted which clocks the flip-flop 46. The power-on signal thus propagates to the power supply for the server 100.

In the preferred delay circuit implementation shown in FIG. 3, a maximum of a two-second delay is implemented. The inventors herein have found this resolution sufficient to distribute in time the in-rush current of over forty servers in a rack-mounted server system. As the embodiments have been shown and described, regardless of whether the power-on request comes by way of the front panel power button 32 or by way of the super I/O controller 30 attempting to return the server 100 to its previous operational condition, the power-on signal propagates through the delay circuit 38. However, while only three bits are used to set the delay in the preferred embodiments, any number of bits, any clock 48 frequency, and any length delay, may be implemented. In situations where the delay circuit 38 implements relatively long delays, for example ten seconds or more, it may be desirable to have the power-on signal produced by the power button bypass the programmable delay implemented by the delay circuit 38. In other words, a two-second delay may be relatively transparent to a user pressing the front panel power button, but ten seconds or more would be noticeable, requiring additional circuitry. However, one of ordinary skill in the art, now understanding the operation of the delay circuit, could easily design a circuit to bypass the effects of the delay circuit based on pushing power button 32 alone.

The above discussion is meant to be illustrative of the principles and various embodiments of the present invention. Numerous variations and modifications will become apparent to those skilled in the art once the above disclosure is fully appreciated. For example, the circuits described herein for delaying the power-on signal are implemented in a PAL; however, it would be possible to implement the programmable delay of the power-on signal solely in discrete logic or other logic forms, and this too would be within the contemplation of this invention. It is intended that the following claims be interpreted to embrace all such variations and modifications.

What is claimed is:

1. In a rack-mounted server system having a plurality of servers therein, a method comprising:
   restoring the plurality of servers to an operational state automatically after a loss of power to the rack-mounted server system; and
   delaying, selectively, powering on of a first server by implementing a selectable delay circuit coupled between a super input/output controller and a power supply for a power-on signal within the first server.

2. The method as defined in claim 1 further comprising setting a delay time for the selectable delay circuit.

3. The method as defined in claim 2 wherein selling a delay time for the selectable delay circuit further comprises actuating dip switches within the first server that control delay time of the selectable delay circuit.

4. The method as defined in claim 2 wherein setting a delay time for the first sewer further comprises executing a software program to selectively set bits in a non-volatile memory that control delay time in the selectable delay circuit.

5. The method as defined in claim 4 wherein executing a software program to selectively set bits in a non-volatile memory that control delay time in the selectable delay circuit further comprises generating a random number, and selectively setting bits in the non-volatile memory based on the random number.

6. The method as defined in claim 4 wherein executing a software program to selectively set bits in a non-volatile memory that control delay time in the selectable delay circuit further comprises setting bits in the non-volatile memory based on a serial number of the first server.

7. The method as defined in claim 1 further comprising delaying, selectively, powering on of a second server, wherein a power-on delay time for the first server and a power-on delay time for the second server are different.

8. The method as defined in claim 7 wherein delaying, selectively, powering on the first and second servers further comprises:
   delaying, for the power-on delay time for the first server, the power-on signal issued by the super input/output controller to the power supply of the first server; and
   delaying, for the power-on delay time for the second server, a power-on signal issued by a super input/output controller to a power supply of the second server.

9. The method as defined in claim 8 wherein the delaying steps further comprise implementing a selectable delay circuit between the super input/output controller and the power supply for the power-on signals one each in the first and second server, and wherein the selectable delay circuits provide a programmable delay of the power-on signals propagating between the super input/output controllers and the power supplies of the first and second servers.

10. A rack-mounted server system comprising:
    a first sewer mounted in the rack-mounted server system, the first server further composing
    a super input/output controller having a power-on output signal;
    a power supply having a power-on input signal, and wherein the power supply turns on in response to assertion of the power-on input signal; and
    a delay circuit coupling the power-on output signal of the super input/output controller to the power-on input signal of the power supply, and wherein the delay circuit provides an adjustable delay of an asserted state of the power-on output signal;
    a second server mounted in the rack-mounted server system; and
    wherein the first and second servers are configured to automatically power-on at different times when power is restored to the rack-mounted server system after loss of power, when the first and second servers were in full operation at the loss of power.

11. The system as defined in claim 10 wherein the delay circuit further comprises:
    a timer circuit, and wherein the timer circuit asserts a timer output signal at a predetermined time after return of auxiliary power to each of the first server and the second server; and
    a latch circuit coupled to the timer output signal and the power-on output signal of the super input/output controller, and wherein the latch circuit latches an asserted state of the power-on output signal and allows the asserted state of the power-on output signal to propagate to the power supply upon assertion of the timer output signal.

12. The system as defined in claim 11 wherein the timer circuit further comprises:
    an oscillator producing a clock signal;
    a counter coupled to the clock signal and producing a count output signal;
    a set of count setpoint signals; and
    a comparator coupled to the count output signal and the setpoint signals, and wherein the comparator asserts the timer output signal when the count output signals match the setpoint signals.

13. The system as defined in claim 12 wherein the clock signal produced by the oscillator has a frequency of four Hertz.

14. The system as defined in claim 12 wherein the count output signal of the counter is a three bit signal.

15. The system as defined in claim 12 wherein the setpoint signal is a three bit signal.

16. The system as defined in claim 11 wherein the timer circuit further comprises:
    a microcontroller coupled to a secondary expansion bus in each of the first server and the second server;
    a non-volatile memory coupled to the microcontroller;
    a serial-to-parallel conversion device coupled to the microcontroller by way of a serial transfer line; and
    wherein the microcontroller reads the non-volatile memory and transfers a setpoint signal serially to the serial-to-parallel device, and wherein the serial-to-parallel device converts the setpoint for use by the comparator.

17. The system as defined in claim 12 wherein the timer circuit further comprises a set of electrical switches each having a first pole coupled to ground and a second pale coupled to a power source through a pull-up resistor, the second pole of each switch coupled to the comparator and forming the setpoint signals.

18. A server for use in a rack-mounted server system comprising:
    a microprocessor;
    a main memory array;
    a bridge device coupling the microprocessor and the main memory array;

a mass storage device coupled to the bridge device;
a controller coupled to the bridge device, and also coupled to a front panel power button, wherein the controller is configured to assert a power-on output signal when the front panel power button is actuated, and wherein the controller is further configured to assert the power-on output signal to bring the server to its prior operational state after a loss of power;
a delay circuit coupling the power-on output signal from the controller to a power supply, and wherein the delay circuit is configured to programmably delay an assertion of the power-on output signal to the power supply.

19. The system as defined in claim 18 wherein the delay circuit further comprises:
a timer circuit, and wherein the timer circuit asserts a timer output signal at a predefined time after return of auxiliary power to the server; and
a latch circuit coupled to the timer output signal and the power-on output signal of the controller, and wherein the latch circuit latches an asserted state of the power-on output signal and allows the asserted state of the power-an output signal to propagate the power supply upon assertion of the timer output signal.

20. The system as defined in claim 19 wherein the timer circuit further comprises:
an oscillator producing a clock signal;
a counter coupled to the clock signal and producing a count output signal;
a set of count setpoint signals; and
a comparator coupled to the count output signal and the setpoint signals, and wherein the comparator asserts the timer output signal when the count output signals match the setpoint signals.

21. The system as defined in claim 20 wherein the clock signal produced by the oscillator has a frequency of four Hertz.

22. The system as defined in claim 20 wherein the count output signal of the counter is a three bit signal.

23. The system as defined, in claim 20 wherein the setpoint signal is a three bit signal.

24. The system as defined in claim 19 wherein the timer circuit further comprises:
a microcontroller coupled to a secondary expansion bus of the server;
a non-volatile memory coupled to the microcontroller;
a serial-to-parallel conversion device coupled to the microcontroller by way of a serial transfer line; and
wherein the microcontroller reads the non-volatile memory and transfers a setpoint signal serially to the serial-to-parallel device, and wherein the serial-to-parallel device converts the setpoint for use by the comparator.

25. The system as defined in claim 20 wherein the timer circuit further comprises a set of electrical switches each having a first pole coupled to ground and a second pole coupled to a power source through a pull-up resistor, the second pole of each switch coupled to the comparator and forming the setpoint signals.

26. A computer for use as a server in a rack-mounted server system comprising:
a microprocessor;
a main memory array;
a bridge device coupling the microprocessor and the main memory array;
a mass storage device coupled to the bridge device;
a super input/output (super I/O) controller coupled to the bridge device, and also coupled to a front panel power button, wherein the super I/O controller is configured to assert a power-on output signal when the front panel power button is actuated, and wherein the super I/O controller is further configured to assert the power-on output signal to bring the server to its prior operational state after a loss of power;
a means for selectively delaying an assertion of the power-on output signal to a power supply, the means for selectively delaying coupling the power-on output signal from the super I/O controller to the power supply.

27. The system as defined in claim 26 wherein the means for selectively delaying further comprises a delay circuit coupled between the super I/O controller and the power supply, and wherein the delay circuit is adapted to provide an adjustable delay of the propagation of an asserted state of the power-on output signal to the power supply.

28. The system as defined in claim 27 wherein the delay circuit further comprises:
a timer circuit, and wherein the timer circuit asserts a timer output signal at a predefined time after return of auxiliary power to the server; and
a latch circuit coupled to the timer output signal and the power-on output signal of the super I/O controller, and wherein the latch circuit latches an asserted state of the power-on output signal and allows the asserted state of the power-on output signal to propagate the state the power supply upon assertion of the timer output signal.

29. The system as defined in claim 28 wherein the timer circuit further comprises:
an oscillator producing a clock signal;
a counter coupled to the clock signal and producing a count output signal;
a set of count setpoint signals; and
a comparator coupled to the count output signal and the setpoint signals, and wherein the comparator asserts the timer output signal when the count output signals match the setpoint signals.

30. The system as defined in claim 29 wherein the clock signal produced by the oscillator has a frequency of four Hertz.

31. The system as defined in claim 29 wherein the count output signal of the counter is a three bit signal.

32. The system as defined in claim 29 wherein the setpoint signal is a three bit signal.

33. The system as defined in claim 28 wherein the timer circuit further comprises:
a microcontroller coupled to a secondary expansion bus of the server;
a non-volatile memory coupled to the microcontroller;
a serial-to-parallel conversion device coupled to the microcontroller by way of a serial transfer line; and
wherein the microcontroller reads the non-volatile memory and transfers a setpoint signal serially to the serial-to-parallel device, and wherein the serial-to-parallel device converts the setpoint for use by the comparator.

34. The system as defined in claim 29 wherein the timer circuit further comprises a set of electrical switches each having a first pole coupled to ground and a second pole coupled to a power source through a pull-up resistor, the second pole of each switch coupled to the comparator and forming the setpoint signals.

* * * * *